United States Patent [19]

Leo

[11] Patent Number: 4,561,950
[45] Date of Patent: Dec. 31, 1985

[54] POST-FORMABLE RADIATION-CURING COATINGS

[75] Inventor: A. Frank Leo, Palatine, Ill.

[73] Assignee: DeSoto, Inc., Des Plaines, Ill.

[21] Appl. No.: 595,575

[22] Filed: Apr. 2, 1984

[51] Int. Cl.$^4$ .................. C08J 3/28; C08L 33/08; C08L 33/10
[52] U.S. Cl. ..................................... 522/91; 525/28; 525/29; 525/279; 525/925; 528/26
[58] Field of Search ................ 204/159.13; 526/279; 525/193, 222, 212, 28, 29, 925; 528/26

[56] References Cited

U.S. PATENT DOCUMENTS

| Re. 29,131 | 2/1977 | Smith et al. | 204/159.14 |
|---|---|---|---|
| 4,043,982 | 8/1977 | O'Sullivan et al. | 526/279 |
| 4,293,678 | 10/1981 | Carter et al. | 526/279 |
| 4,337,130 | 6/1982 | Abramjian | 525/28 |
| 4,348,462 | 9/1982 | Chung | 526/279 |
| 4,369,300 | 1/1983 | Carter et al. | 204/159.13 |

Primary Examiner—Allan M. Lieberman
Attorney, Agent, or Firm—Dressler, Goldsmith, Shore, Sutker & Milnamow, Ltd.

[57] ABSTRACT

Radiation curable, post-formable liquid coating compositions which cure on radiation exposure to provide coatings which resist exterior exposure are disclosed. These comprise:

(1) a silicone dicarbinol diurethane diacrylate or dimethacrylate in which the carbinol groups are carried by an ethoxylate constituting from 30% to 70% of the silicone dicarbinol;

(2) a linear dihydroxy-functional $C_4$–$C_8$ dicarboxylic acid-$C_2$–$C_4$ diol polyester diurethane diacrylate or dimethacrylate based on a polyester having an average molecular weight in the range of 600 to 2000;

(3) isobornyl acrylate or methacrylate; and (4) acrylic or methacrylic acid.

Components 1 and 2 together provide from 30% to 50% of the composition, with component 2 being present in an amount of from 0% to 65% of the total of components 1 and 2, component 3 is present in an amount of at least 30% of the composition and provides coating viscosity, and component 4 is present in an amount of at least 3% of the composition. When acrylic materials are used, and when a photoinitiator is present, ultraviolet radiation can be used to provide the radiation cure.

6 Claims, No Drawings ic acid, with a stoi-

POST-FORMABLE RADIATION-CURING COATINGS

DESCRIPTION

1. Technical Field

This invention relates to radiation-curing coatings which can be postformed and which resist exterior exposure.

2. Background Art

It is known that metal in strip form can be coated continuously by coil coating, and after the coating is baked to cure the same, appropriate coatings are sufficiently adherent and flexible to allow the coated substrate to be formed into the desired final product. Radiation-curable coatings are more rapidly curable and minimize pollution because they are frequently applied at 100% solids content. Unfortunately, the radiation-cross-linked coatings are usually somewhat brittle and are not strongly adherent to a metal substrate so that they cannot be formed after curing without fracturing the coating or separating it from the base. Also, it has been difficult to obtain radiation-cured coatings which are resistant to exterior exposure.

DISCLOSURE OF INVENTION

In this invention, I combine: (1) a silicone dicarbinol diurethane diacrylate or dimethacrylate in which the carbinol groups are carried by an ethoxylate constituting from 30% to 70% of the silicone dicarbinol; (2) a linear dihydroxy-functional $C_4$–$C_8$ dicarboxylic acid-$C_2$–$C_4$ diol polyester diurethane diacrylate or dimethacrylate in which the polyester has an average molecular weight in the range of 600 to 2000; (3) isobornyl acrylate or methacrylate; and (4) acrylic acid or methacrylic acid, into a liquid coating composition which cures on radiation exposure. When an appropriate photoinitiator is present, and when acrylates are used, ultraviolet radiation may be used to provide the desired cure. When electron beam or similar radiation is employed, photoinitiators are not needed, and the methacrylates can be used, though methacrylates do not provide a good cure when ultraviolet radiation is employed.

Components 1 and 2 together provide from 30% to 50% of the coating composition. Component 1 is essential, but component 2 is optional, and thus may constitute from 0% to 65% of the total weight of components 1 and 2. Since component 2 lowers the cost of the composition and also improves resistance to methyl ethyl ketone, it is normally present in an amount of from 40% to 60% of the total weight of components 1 and 2.

It is to be noted that all proportions herein, including the examples and the claims, are by weight, unless otherwise specified.

Component 3 is essential. It serves to lower the viscosity of the coating composition to eliminate, or largely eliminate, the need for volatile organic solvent. This function determines the proportion of this component. Thus, component 3 is used in an amount of at least 30%, but not in excess of that amount which provides appropriate coating viscosity. In this connection, roller coating is normally utilized in coil coating, and a viscosity appropriate for roller coating is normally utilized.

Component 4 provides adhesion and lowers viscosity. At least 3% is used, but preferred proportions are from 7% to 18%. Best results are obtained using from 8% to 15%.

Optionally, one may include up to about 10% of the composition of a $C_4$ to $C_8$ diol diacrylate, such as butane diol diacrylate or hexane diol diacrylate, in order to enhance chemical resistance, but this is not essential.

The result of this combination of components is a radiation-curable coating which can be applied to steel substrates and radiation-cured to form a hard coating which resists exterior exposure. The cured coating adheres strongly to the metal substrate and it can be post-formed to transform a section of the coil-coated metal into a fabricated product. The post-forming operation may be carried out immediately following radiation cure, or the post-forming operation may be carried out whenever it is convenient. This is important because it is common to combine the fabrication equipment with the coating line, and this means that the wet coated substrate is almost instantly cured and then fabricated a few seconds thereafter on the same production line.

Referring more particularly to component 1, the silicone dicarbinol diurethane diacrylate, these are based on organic polysiloxanes having two substituents having a carbinol-terminal group. The carbinol group is provided by starting with a dihydroxy-terminated organic polysiloxane and ethoxylating it with ethylene oxide so that the ethoxylate constitutes from 30% to 70% of the dicarbinol which is produced. The carbinol functionality in the ethoxylate is reacted with an organic diisocyanate, such as 2,4-toluene diisocyanate or isophorone diisocyanate, and also with an hydroxy-functional acrylate, such as 2-hydroxyethyl acrylate or 2-hydroxypropyl acrylate, to provide a diacrylate-functional diurethane derivative of the organic polysiloxane dicarbinol. The corresponding methacrylates, such as 2-hydroxyethyl methacrylate, can be used when electron beam curing is intended.

The sequence of the above reactions is known to be variable, it being permissible to react the silicone dicarbinol with excess diisocyanate and then with the hydroxy acrylate, or to prereact the hydroxy acrylate with a molar proportion of the diisocyanate to form an unsaturated monoisocyanate which is then reacted with the dicarbinol in a stoichiometric amount based on isocyanate and carbinol functionalities.

The usual organic polysiloxanes which are available in commerce are methyl or phenyl substituted (methyl substitution is preferred and will be used in the examples) and have a molecular weight in the range of 600 to 10,000. As is known, the valences of the silicon atoms in the polysiloxane carry inert organic substituents, such as methyl and/or phenyl substituents, except for the two hydroxy groups which are ethoxylated to provide the terminal carbinol groups. The initial polysiloxane can be dihydroxy terminated or it can be prereacted with a monoepoxide, such as propylene oxide or butylene oxide to provide carbinol termination which is then adducted with from 30% to 70%, preferably from 40% to 60%, of ethylene oxide to form the polyethoxylate utilized herein after it is converted into a urethane acrylate.

The linear dihydroxy-functional polyester diurethane diacrylate component uses the same diisocyanates and the same hydroxy acrylates or methacrylates noted previously. The polyester portion of this component is a linear dihydroxy-functional $C_4$–$C_8$ dicarboxylic acid-$C_2$–$C_4$ diol polyester having an average molecular weight in the range of 600 to 2000. It is produced by polyesterification of a $C_4$ to $C_8$ dicarboxylic acid, such as succinic acid or, preferably, adipic acid, with a stoichiometric excess of a $C_2$ to $C_4$ diol. While propylene glycol and butylene glycols are useful, it is preferred to employ ethylene glycol as the diol. Thus, adipic acid-ethylene glycol dihydric polyesters are preferred for use herein, typical molecular weights being 1000 and 1200. The stoichiometry is adjusted so that substantially complete esterification provides a dihydric polyester having an average molecular weight in the range of 600 to 2000, preferably in the range of 800 to 1600. These are converted to diurethane diacrylates in the same way discussed previously.

Isobornyl acrylate is essential to provide the combination of rapid radiation cure, flexibility needed for post-formability, and liquidity required for the avoidance of volatile solvents. While the corresponding methacrylate is also useful, this component cannot otherwise be replaced, even by other acrylate monomers having a similar glass transition temperature.

The photoinitiators useful to enable ultraviolet cure are well known and will not be discussed at length. Acetophenone and benzophenone will illustrate the photoinitiators in this well known class. This invention will be exemplfied using the commercial ketonic photoinitiator, Irgacure 184, so it will be understood that the photoinitiator selection is not an essential aspect of this invention.

The acrylic acid component is also essential, and while methacrylic acid can be used when electron beam cure is involved, other acids will not replace it. Better corrosion resistance is obtained when the proportion of acrylic acid is increased into the preferred range noted previously.

The combination of the various components is itself routine, simple mixing with the aid of a little heat being all that is required to form the separate components into a compatible blend suited for application to the metal substrate. The proportion of the isobornyl acrylate and the acrylic acid are selected to provide the desired final viscosity, so obtaining a uniform admixture is all that is required.

The metal substrate is usually steel, or phosphated or chromated steel or galvanized steel, the coatings of this invention exhibiting reasonably good adhesion to all of these different substrates.

The invention is illustrated in the following examples

EXAMPLE 1

| Component | Parts |
| --- | --- |
| 1 - isobornyl acrylate | 40 |
| 2 - hexane diol diacrylate | 3 |
| 3 - Irgacure 184 (Ciba-Geigy) | 4.1 |
| 4 - t-butyl phenol stabilizer | 0.02 |
| 5 - dihydroxy-functional polymethyl polysiloxane polyethoxylated to 50% with ethylene oxide to have a molecular weight of 6000 reacted with isophorone diisocyanate and 2-hydroxyethyl acrylate to provide a silicone diurethane diacrylate (see note 1) | 19.7 |
| 6 - dihydroxy-functional polyester of ethylene glycol and adipic acid of molecular weight 1200 reacted with isophorone diisocyanate and 2-hydroxyethyl acrylate to provide a polyester diurethane diacrylate (see note 2) | 23.1 |

| Component | Parts |
| --- | --- |
| 7 - acrylic acid | 10.1 |

Note 1: The Dow Corning product 04-3667 may be used to provide the ethoxylated polysiloxane
Note 2: The Morton Thiokol product Uvithane 893 may be used to provide this component The above components are warmed to 100° F. after admixture and stirred to until the mixture is uniform. The mixture had a viscosity of 370 centipoises. This coating composition was roller coated upon galvanized steel in a thickness of 0.5 mil and the applied coating was cured under nitrogen using an ultraviolet exposure of 0.8 Joule per square centimeter. The cured coated steel could be fabricated immediately into a fence post of rectangular cross-section.

EXAMPLE 2

Example 1 is repeated, except that 1% of benzophenone is added. The coating on galvanized steel cured using the same ultraviolet exposure, except that the nitrogen blanket was omitted since this modified coating cured in air. The same characteristics are obtained by the cure in air.

What is claimed is:
1. A radiation curable, post-formable liquid coating composition comprising:
   (1) a silicone dicarbinol diurethane diacrylate or dimethacrylate based on a methyl or phenyl-substituted polysiloxane having a molecular weight of from 600 to 10,000, and in which the carbinol groups are carried by an ethoxylate constituting from 30% to 70% of the silicone dicarbinol;
   (2) a linear dihydroxy-functional $C_4$–$C_8$ dicarboxylic acid-$C_2$–$C_4$ diol polyester diurethane diacrylate or dimethacrylate based on a polyester having an average molecular weight in the range of 600 to 2000;
   (3) isobornyl acrylate or methacrylate; and
   (4) acrylic or methacrylic acid;
      said components 1 and 2 together providing from 30% to 50% of the composition, with component 2 being present in an amount of from 0% to 65% of the total of components 1 and 2, said component 3 being present in an amount of at least 30% of the composition and providing coating viscosity, and said component 4 being present in an amount of at least 3% of the composition.
2. A coating composition as recited in claim 1 in which said component 2 is present in an amount of from 40% to 60% of the total of components 1 and 2.
3. A coating composition as recited in claim 2 in which said polyester is formed by reacting ethylene glycol with adipic acid to provide a molecular weight in the range of 800 to 1600.
4. A coating composition as recited in claim 1 in which acrylates are selected for all four components, and a photoinitiator is present to enable an ultraviolet cure.
5. A coating composition as recited in claim 1 in which said acrylic acid component is present in an amount of from 7 to 18% of the composition.
6. A radiation curable, post-formable liquid coating composition comprising:
   (1) a silicone dicarbinol diurethane diacrylate based on a methyl or phenyl-substituted polysiloxane ethoxylated to from 40% to 60% and having a molecular of from 600 to 10,000;
(2) a linear dihydroxy-functional adipic acid-ethylene glycol polyester diurethane diacrylate in which the polyester has a molecular weight in the range of 800 to 1600;
(3) isobornyl acrylate;
(4) acrylic acid;

said components 1 and 2 together providing from 30% to 50% of the composition, with component 2 being present in an amount of from 40% to 60% of the total of components 1 to 2, said component 3 being present in an amount of at least 30% of the composition and providing coating viscosity, said component 4 being present in an amount of from 7% to 18% of the composition, and a photoinitiator to enable an ultraviolet cure.

* * * * *

UNITED STATES PATENT AND TRADEMARK OFFICE
CERTIFICATE OF CORRECTION

PATENT NO. : 4,561,950
DATED : December 31, 1985
INVENTOR(S) : A. Frank Leo

It is certified that error appears in the above-identified patent and that said Letters Patent is hereby corrected as shown below:

In Note 1 at Column 4, line 5, "O4-3667" should read:

-- Q4-3667 --

Signed and Sealed this

Twenty-fifth Day of March 1986

[SEAL]

Attest:

DONALD J. QUIGG

Attesting Officer

Commissioner of Patents and Trademarks